(12) United States Patent
Blaser et al.

(10) Patent No.: US 7,565,727 B2
(45) Date of Patent: Jul. 28, 2009

(54) METHOD OF TUBE STUB REMOVAL

(75) Inventors: Wade Paul Blaser, Delta (CA); Owen Burkle, Cambridge (CA)

(73) Assignee: Babcock & Wilcox Canada Ltd., Cambridge Ontario (CA)

( * ) Notice: Subject to any disclaimer, the term of this patent is extended or adjusted under 35 U.S.C. 154(b) by 151 days.

(21) Appl. No.: 11/762,104

(22) Filed: Jun. 13, 2007

(65) Prior Publication Data

US 2008/0000066 A1 Jan. 3, 2008

Related U.S. Application Data

(60) Provisional application No. 60/814,415, filed on Jun. 16, 2006.

(51) Int. Cl.
*B23P 6/00* (2006.01)
(52) U.S. Cl. .............. 29/402.01; 29/402.11; 29/402.21; 29/426.5

(58) Field of Classification Search ............ 29/890.031, 29/890.043, 890.053, 402.01, 402.05, 402.06, 29/402.19, 402.21, 426.1, 426.4, 426.5, 426.6, 29/890.051, 890.07, 402.11
See application file for complete search history.

(56) References Cited

U.S. PATENT DOCUMENTS 4,000,556 A * 1/1977 Ciminero ................ 29/890.031
4,043,018 A * 8/1977 Neff ....................... 29/890.031
7,297,908 B2 * 11/2007 Yoshida et al. ............. 219/635

* cited by examiner

*Primary Examiner*—Jermie E Cozart
(74) *Attorney, Agent, or Firm*—Michael J. Seymour; Eric Marich

(57) ABSTRACT

The invention is related to an improved method of removing tubes from tubes sheets. The improved method softens and elongates a tube circumferentially surround by tube sheet, wherein the softening and elongating steps allow for quick and easy removal of the tube from the tube sheet without damaging the tube sheet or tube seats.

3 Claims, 2 Drawing Sheets

METHOD OF TUBE STUB REMOVAL

FIELD AND BACKGROUND OF INVENTION

The present invention relates generally to the field of tube extraction, and more particularly to an improved method of facilitating the removal of tubes from structures comprising tube sheets, such as boilers, condensers, evaporators, drums, and the like.

A typical heat exchanger comprises a pair of parallel tube sheets, a plurality of baffle plates, and a plurality of heat exchanger tubes. The tube sheets are located at the ends of the heat exchanger. The baffle plates are positioned between the tube sheets and generally parallel thereto. The tubes extend between the tube sheets and through the baffle plates and are supported by the tube sheets. The tube sheets and baffle plates have a series of aligned holes formed therein, and the tubes are inserted through these holes and then expanded in the areas of the tube sheets into fluid-tight pressure contact therewith.

Because of malfunctions or normal preventive maintenance, it may be necessary to remove one or all of the tubes from the structure. To replace the tubes they are generally cut between the tube ends and the expanded ends of the tubes forcibly withdrawn from the tube sheets an inch or two until they can be withdrawn by hand.

Various tools have been suggested for removing these tubes by using wedges that are driven inside a bore of a structure, expanded for engaging the inside wall of a tube and retracted for pulling the tube out of the bore.

U.S. Pat. No. 4,355,450 to Miller discloses a tube extracting mechanism having a wedge with expandable circumferential gripping teeth.

U.S. Pat. No. 3,791,011 to Keys shows a tube pulling device with longitudinally fixed radially expanding gripping means which engages the tube wall for withdrawal of the tube from the tube sheet.

U.S. Pat. No. 3,507,028 to Stellatella shows a hydraulic tube puller with radial expansion of an inner end portion at a tube gripping member into the tube wall.

The primary problem with all these prior art structures is the imposition of expansion force on the tube precisely at the point where it is engaged with the tube sheet which can damage the metal between adjacent holes and cause the holes in the tube sheet to enlarge and not properly grip a new tube when it is expanded. Moreover, the prior art devices require additional moving parts which increase the likelihood of malfunctions and breakage of the device, which results in an increase of down-time of the structure for repairs.

The method of the present invention does not expand the tube ends radially but softens the tube and utilizes tensile forces to longitudinal compress the tube being extracted, and possesses many other advantages over the prior art as discussed herein.

SUMMARY OF INVENTION

It is an object of the present invention to provide a method of tube extraction that is easy to use and does not cause damage to the tube sheet upon tube withdrawal.

A further object of the invention is to provide a method of tube extraction that can be used to remove tubes having belled ends from a tube sheet.

A further object of the invention is to provide a method of tube extraction for easily removing ribbed tubes from a tube sheet.

A further object of the invention is to provide a method of tube extraction that can be used to remove ribbed tubes having belled ends from a tube sheet.

Accordingly, the present invention introduced a method of tube extraction comprising providing a tube circumferentially surrounded on at least one end by a tube sheet, cutting the tube to create a tube stub, softening a portion of the tube, attaching a hydraulic jack to the tube stub, elongating the softened portion of the tube with the hydraulic jack, and removing the tube from the tube sheet.

The present invention further introduces a method of tube extraction comprising a method of tube stub removal comprising the steps of providing a tube circumferentially surrounded on at least one end by a tube sheet, the at least one end being belled and the tube comprising a ring for seating the tube in the tube sheet, cutting the tube to create a tube stub, softening a portion of tile tube, attaching a hydraulic jack to the tube stub, elongating the softened portion of the tube with the hydraulic jack, and removing the tube from the tube sheet.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
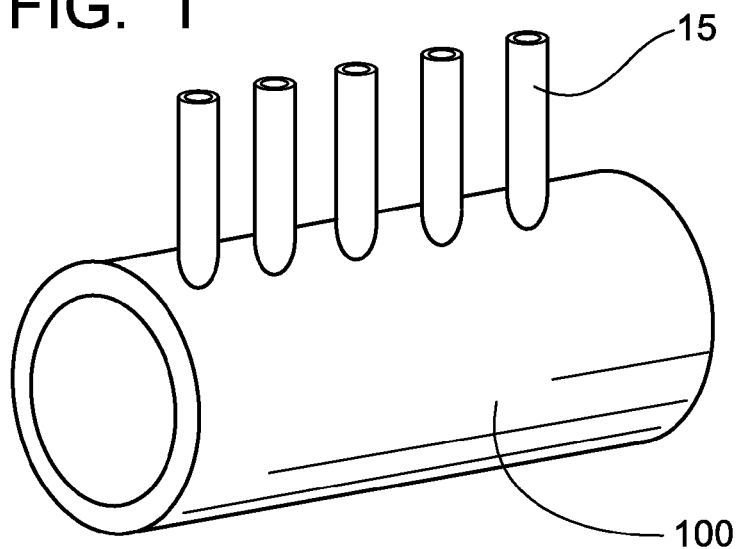
FIG. 1 is a graphical representation of a tube sheet.
Figure 3:
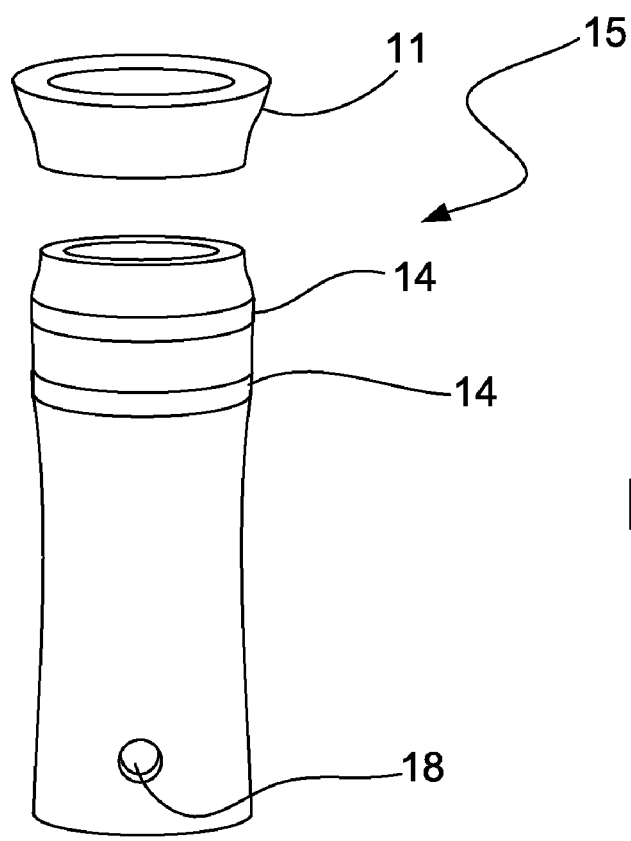
FIG. 3 is a graphical representation of a elongated tube.
Figure 4:
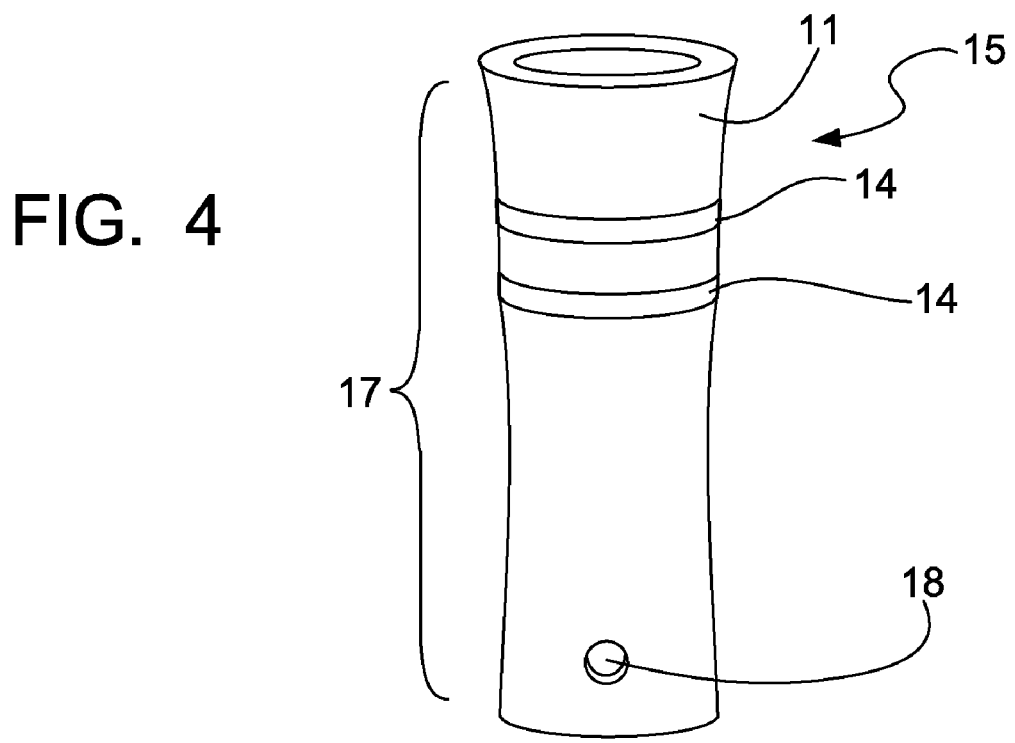
FIG. 4 is a graphical representation of a elongated tube broken between the bell and the rings.

Referring now to the drawings, in which like reference numerals are used to refer to the same or similar elements, FIG. 1 is a graphical representation of a type of tube sheet know as a tube drum 100. Tube drum 100 contains at least one tube 15 and in many cases a plurality of tubes 15. Tubes 15 generally extended through the wall of the tube drum 100, such that a portion of the tube 15 is circumferentially surrounded by the tube drum 100. The tube end extending in the tube drum 100 may be belled 11 (FIGS. 3, 4) as a means to secure and seal the tube 15. Ribs 14 (FIGS. 3, 4) may also be present on the tube 15 for similar purposes.

Figure 2:
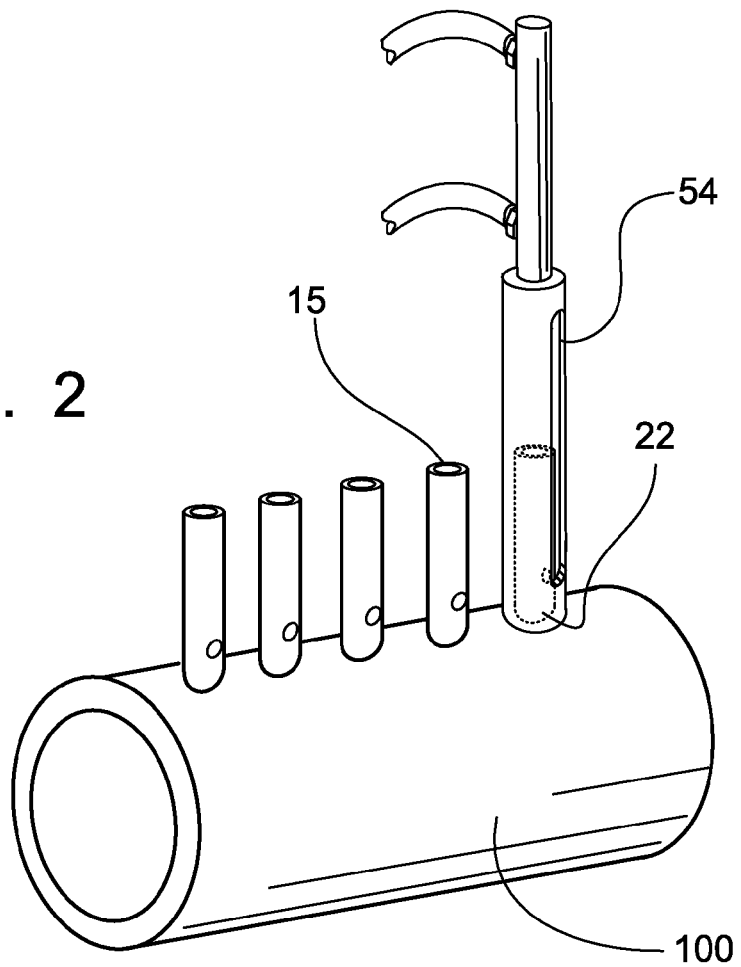
FIG. 2 is a graphical representation of a hydraulic jack attached to a tube stub.

In a first step of the method, tube 15 is cut to produce a tube stub 22, FIG. 2, extending outwardly from tube drum 100. Tube 15 is preferably cut by touch to produce tube stub 22, but may be cut by any known means without deviating from the present invention. Hydraulic jack 54 is attached to tube stub 22. In a preferred embodiment a hole 18 (FIGS. 3, 4) is cut in the stub and the hydraulic jack 54 is attached by a bolt extending through the cut hole 18 and secured to ends of the hydraulic jack 54. Alternatively an attachment with clamping ends may be used to attach the hydraulic jack 54 to the tube stub 22 end protruding outside of the tube drum 100.

A portion of the tube 15 circumferentially surround by the tube drum 100 is then softened. In the step of softening a portion of the tube 15 is rapidly heated. In a preferred embodiment an induction heating coil such as the coil described in U.S. Pat. No. 6,778,057, herein incorporated by reference, is inserted into the portion of the tube 15 surround by the tube drum 100, and induction heating is applied to the tube 15, rapidly heating the tube to a temperature greater than about 900° C. to about 1000° C. In an alternative embodiment a flame or any other conventional heating means may be used to soften the tube The softened tube is then elongated. Elongation occurs by operating the hydraulic jack 54 in a manner that places tensile force on the softened portion of the tube 15 prior to the tube 15 cooling to an ambient temperature. In a preferred embodiment, FIG. 3, the elongation step circumferentially reduces a potion of the tube diameter 17, allowing easy removal of the tube 15 from the tube drum 100 without damaging the tube drum 100. In an alternative embodiment heating may be localized around the belled 11, FIG. 3, and/or ribbed 14 section of tube 15, such that the elongation step tears the tube into two pieces. In this embodiment one piece of the torn tube is removed from the inside of the tube drum 100, and one piece from the outside of the tube drum 100. The removal step may be accomplished by hand, but is preferably accomplished by allowing hydraulic jack 54 to continue operation after the elongation step such that hydraulic jack 54 removes tube 15 from tube drum 100.

While specific embodiments of the invention have been shown and described in detail to illustrate the application of the principles of the invention, it will be understood that the invention may be embodied otherwise without departing from such principles.

We claim:

1. A method of tube stub removal consisting of the steps of
providing a tube circumferentially surrounded on at least one end by a tube sheet,
cutting the tube to create a tube stub,
utilizing induction heating to rapidly heat and soften the portion of the tube circumferentially surrounded by the tube sheet,
attaching a hydraulic jack to the tube stub,
elongating the softened portion of the tube with the hydraulic jack, and
removing the tube from the tube sheet.

2. A method of tube stub removal consisting of the steps of
providing a tube circumferentially surrounded on at least one end by a tube sheet, the at least one end being belled and the tube comprising a ring for seating the tube in the tube sheet,
cutting the tube to create a tube stub,
utilizing induction heating to rapidly heat and soften the entire portion of the tube circumferentially surrounded by the tube sheet,
attaching a hydraulic jack to the tube stub,
elongating the softened portion of the tube with the hydraulic jack, and
removing the tube from the tube sheet.

3. A method of tube stub removal consisting of the steps of
providing a tube circumferentially surrounded on at least one end by a tube sheet, the at least one end being belied and the tube comprising a ring for seating the tube in the tube sheet,
cutting the tube to create a tube stub,
utilizing induction heating to rapidly heat and soften the portion of the tube circumferentially surrounded by the tube sheet,
clamping a hydraulic jack to the tube stub,
elongating the softened portion of the tube with the hydraulic jack, and
removing the tube from the tube sheet.

* * * * *